United States Patent [19]

Bertelli et al.

[11] Patent Number: 4,833,186

[45] Date of Patent: May 23, 1989

[54] POLYMERIC COMPOSITIONS ENDOWED WITH SELF-EXTINGUISHING PROPERTIES CONTAINING MELAMINE BROMOHYDRATE

[75] Inventors: Guido Bertelli; Renato Locatelli, both of Ferrara, Italy

[73] Assignee: Himont Inc., Milan, Italy

[21] Appl. No.: 135,486

[22] Filed: Dec. 21, 1987

Related U.S. Application Data

[63] Continuation of Ser. No. 906,292, Sep. 11, 1986, abandoned, which is a continuation of Ser. No. 708,577, Mar. 5, 1985, abandoned.

[30] Foreign Application Priority Data

Mar. 7, 1984 [IT] Italy ............................... 19926 A/84

[51] Int. Cl.$^4$ ................................................ C08K 5/34
[52] U.S. Cl. .................................... 524/100; 524/466; 524/486

[58] Field of Search .................... 524/100, 466, 486; 525/333.8, 337

[56] References Cited

U.S. PATENT DOCUMENTS

| | | | |
|---|---|---|---|
| 3,420,786 | 1/1969 | Weber et al. | 524/486 |
| 3,441,524 | 4/1969 | Burger et al. | 524/469 |
| 3,850,882 | 11/1974 | Underwood et al. | 524/430 |
| 4,028,333 | 6/1977 | Linduay | 524/100 |
| 4,430,467 | 2/1984 | Lesniewski et al. | 524/486 |

*Primary Examiner*—Kriellion Morgan
*Attorney, Agent, or Firm*—Stevens, Davis, Miller & Mosher

[57] ABSTRACT

Self-extinguishing polymeric compositions comprising by weight:
(1) from 49 to 99% of a thermoplastic polymer
(2) from 1 to 50% of melamine bromohydrate
(3) from 0 to 1% of a promoter of free radicals.

3 Claims, No Drawings

POLYMERIC COMPOSITIONS ENDOWED WITH SELF-EXTINGUISHING PROPERTIES CONTAINING MELAMINE BROMOHYDRATE

This application is a continuation of application Ser. No. 906,292, filed Sept. 11, 1986, now abandoned, which in turn is a continuation of application Ser. No. 708,577, filed Mar. 5, 1985, now abandoned.

BACKGROUND OF THE INVENTION

Different methods to provide polymers with flame resistance are known in the art: said methods are generally based on the addition to the polymer of thermolabile halogenated compounds associated with metallic compounds, specially antimonic and/or bismuthic compounds.

The combinations between metallic compound and halogenated compound generally give satisfactory results as far as the polymers characteristics of flame resistance are concerned, but they involve more or less serious inconveniences and in particular:
- corrosion phenomena in the equipments wherein the treatment of polymers with such additives is carried out;
- worsening in the emission of darkening smokes during combustion and/or decomposition of said polymers;
- need of manipulating highly toxic substances such as, for example, antimony sequioxide.

It is known as well that ammonium salts of hydric acids generally have an effective action as flame retarders in many fields such as the field of paints and coatings in general, but they cannot be used directly as additives in thermoplastic polymers due to their high corrosivity with respect to metals, their extreme sensitivity to water and air humidity, and their poor thermal and thermooxidative stability.

THE PRESENT INVENTION

The Applicant has now surprisingly found that most of the thermoplastic polymers commonly used today can reach good levels of flame resistance when additioned with melamine bromohydrate, alone or in combination with small amounts of a promoter of free radicals, without the risk of any of the previously described inconveniences.

Therefore the object of the present invention is to provide polymeric compositions endowed with self-extinguishing properties, comprising by weight:
(A) from 49 to 99% of a synthetic thermoplastic polymer
(B) from 1 to 50% of melamine bromohydrate
(C) from 0 to 1% of a promoter of free radicals.

In such compositions, melamine bromohydrate is preferably present in the amount of 3:5% by weight. When the promoter of free radicals is absent, the amount of melamine bromohydrate in said compositions is preferably equivalent to or exceeding 15% by weight on the composition.

Examples of termoplastic polymers to be possibly used in the compositions of the present invention are olefinic polymers such as for instance polypropylene, polypropylene modified with ethylene, ethylene/propylene copolymers, mixtures of polypropylene with up to 20% by weight of ethylene/propylene elastomeric copolymers containing up to 50% by weight of copolymerized ethylene and polystyrene as well (crystal and shockproof), ABS resins and polyamides.

Examples of promoters of free radicals to be possibly used are 2,3-dimethyl-2,3-diphenyl butane and 2,3-dimethyl-2,3-diphenyl hexane. Organic peroxides can also be used as promoters of free radicals in the present compositions, preferably in amounts ranging between 0.05 and 0.1 parts by weight.

Melamine bromohydrate, ground at few micron fineness, also proves suitable to be used for improving flame resistance of fibers, raffia and in general of fabrics made of polypropylene and of other thermoplastic polymers hereinabove mentioned, provided they are suitable to be spun under the usual conditions and according to the techniques known in the art.

Melamine bromohydrate can be prepared according to one of the hereunder described methods (A) and (B):
(A) 1 mole (126 g) of powdered melamine is dispersed in 95% ethyl alcohol and kept under stirring. 1 mole (81 g) of hydrobromic acid in 47% aqueous solution is then added. The mixture is left under stirring for one hour at room temperature, filtered, repeatedly washed with alcohol and dried. Approximately 200 g of melamine bromohydrate are obtained with approximately 100% yield.
(B) 1 mole (81 g) of hydrobromic acid in 47% aqueous solution is added and let to be absorbed by 1 mole (126 g) of melamine placed in a porcelanized flask. Drying is then carried out and the grit obtained is ground. Approximately 200 g of melamibne bromohydrate are obtained.

The compositions of the present invention can be prepared according to conventional methods, for instance by mixing the polymer with the additives in a banbury mixer at a temperature equivalent to or exceeding the polymer softening temperature and then by extruding the mixture in an extruder at the most suitable temperature to obtain a product in granules.

In order to evaluate the self-extinguishing properties of the compositions, 3 mm-thick test pieces are molded from the granular product by means of a CARVER molding machine, operating at a temperature at least corresponding to the polymer softening temperature, at 40 kg/cm$^2$ pressure for 7 minutes.

The degree of flame resistance is determined on said test pieces by means of the "Oxigen Index" measure (according to ASTM-D2863 specification), which gives the minimum percentage of oxygen in mixture with nitrogen necessary for the sample to burn continuously, as well as by complying with UL-94 specifications (published by Underwriters Laboratories—USA) which provide an evaluation of the extinguishing degree of plastic materials. In applying such specifications, the "Vertical Burning Test" is adopted: it allows to classify the materials at 94 V-0, 94 V-1 and 94 V-2 levels on the basis of the test pieces combustion time and on the basis of the fact that they do or do not drop inflamed particles. According to said method, the test piece is primed, keeping it in vertical position, by approaching the flame to its lower end, performing two ignition attempts, each of them lasting 10 seconds. Each test is performed on a group of 5 test pieces, also carrying out measurement of the extinction time for 4 subsequent ignitions on the same test piece as further differentiating criterium.

The corrosive properties of the materials on metals are generally determined by means of tests which consider the molding of the material itself at growing temperatures on perfectly clean and polished iron plates. It will be possible to notice, after some time, the appearance of stains and signs of corrosion on the metal surface kept in an ambient at high degree of relative humidity.

In order to evaluate smoke emission during combustion/decomposition of the plastic materials object of the present invention, a system of the ponderal type based on the use of suitable equipment manufactured by Arophoe Chemicals USA is used. Emission entity (mg/cc) and emission speed (mg/min.) are determined by collecting the smoke emitted during sample pyrolysis on a volumetric filtr.

Tables 1 to 6 report examples which illustrate the compositions of the invention without any limitative purpose.

The compositions of each example were prepared as previously described, using a Dolci extruder with a 20 mm diameter screw, length/diameter ratio of the screw=23 and screw operating speed=20 r.p.m. at a temperature of 200°+240° C.

TABLE I

| | | | | | |
|---|---|---|---|---|---|
| Polypropylene | 99,5 | 94,5 | 94,4 | 94,2 | 94 |
| melamine bromohydrate | — | 5 | 5 | 5 | 5 |
| 2,3-diphenyl-2,3-dimethyl butane | — | — | 0,1 | 0,3 | 0,5 |
| stabilizers (*) | 0,5 | 0,5 | 0,5 | 0,5 | 0,5 |
| Oxygen index | 17,5 | 21,5 | 23,5 | 24,5 | 26 |
| UL-94 (3 mm) | B | B | $V_2$ | $V_2$ | $V_2$ |
| extinction times for 4 subsequent ignitions | / / | / / | 4" 7" 7" 8" | 3" 2" 4" 3" | 1" 2" 2" 1" |

B = burns
(*) = 0.2 parts of Irganox 1010 + 0.3 parts of TPL
V-2 = extinguishes in 30 seconds dropping inflamed particles

TABLE II

| | | | | | | | |
|---|---|---|---|---|---|---|---|
| Polypropylene | 99,5 | 97,85 | 96,2 | 94 | 88,5 | 94,5 | 89 |
| Ethylene/propylene copolymer (*) | — | — | — | — | — | 5 | 5 |
| melamine bromohydrate | — | 1,5 | 3 | 5 | 10 | — | 5 |
| 2,3-diphenyl-2,3-dimethyl butane | — | 0,15 | 0,3 | 0,5 | 1 | — | 0,5 |
| stabilizers (°) | 0,5 | 0,5 | 0,5 | 0,5 | 0,5 | 0,5 | 0,5 |
| Oxygen Index | 17,5 | 23,5 | 24,5 | 26 | 27,5 | 17,3 | 25 |
| UL-94 (3 mm) | B | V-2 | V-2 | V-2 | V-2 | B | V-2 |
| extinction times for 4 subsequent ignitions | / / | 3" 7" 9" 6" | 3" 2" 3" 3" | 1" 2" 2" 1" | ½" ½" ½" 1" | / / | 1" 2" 1" 1" |

(*) $C_2$ = 57%; $C_3$ = 43% by weight
(°) 0,2 parts of Irganox 1010 + 0.3 parts of TPL
B = burns
$V_2$ = extinguishes in 30 seconds dropping inflamed particles

TABLE III

| | | | | | | | | | | |
|---|---|---|---|---|---|---|---|---|---|---|
| Polystyrene (crystal) | 100 | 96,7 | 70 | — | — | — | — | — | — | — |
| Shockproof polystyrene | — | — | — | 100 | 94,5 | 70 | — | — | — | — |
| Nylon 6 | — | — | — | — | — | — | 100 | 94,5 | — | — |
| ABS (*) | — | — | — | — | — | — | — | — | 100 | 70 |
| melamine bromohydrate | — | 3 | 30 | — | 5 | 30 | — | 5 | — | 30 |
| 2,3-diphenyl-2,3-dimethyl butane | — | 0,3 | — | — | 0,5 | — | — | 0,5 | — | — |
| Oxygen index | 18 | 23,5 | 26,5 | 17,8 | 23 | 26 | 20 | 25,3 | 18,5 | 26 |
| UL-94 (3 mm) | B | V-2 | V-0 | B | V-2 | V-0 | B | V-2 | B | V-0 |
| extinctions times for 4 subsequent ignitions | — — | 2" 3" 2" 2" | 1" 1" ½" 1" | — — | 1" 2" 2" 2" | 1" 1" 1" 1" | — — | ½" 1" ½" 1" | — — | 1" 1" 1" 1" |

B = burns
V-2 = extinguishes in 30 seconds dropping inflamed particles
V-0 = extinguishes in 5 seconds not dropping inflamed particles
(*) consisting of 15% butadiene, 25% acrylonitrile, 60% styrene.

TABLE IV

| | | | |
|---|---|---|---|
| Polypropylene | 99,5 | 94,5 | 94,45 |
| melamine bromohydrate | — | 5 | 5 |
| di-t-butylperoxide (*) | — | — | 0,02 |
| Irganox 1010 | 0,2 | 0,2 | 0,2 |
| lauryl thiopropionate | 0,3 | 0,3 | 0,3 |
| Oxygen Index | 17,5 | 21,5 | 24,3 |
| UL-94 (3 mm) | B | B | $V_2$ |
| extinction times for 4 subsequent ignitions | / / | / / | 1" 2" 3" 2" |

(*) Trigono B/AKZOCHEMIE

TABLE V

| | Smoke emission | |
|---|---|---|
| | amount (mg/cc) | speed (mg/min) |
| Polystyrene as such | 105 | 17,4 |
| Polystyrene containing 12% by weight of decabromodiphenyl and 6% by weight of antimony trioxide, at extinguishing degree = V0 | 140 | 30 |
| Polystyrene containing 18% by weight of melamine bromohydrate, at self-extinguishing degree = V0 | 70 | 11 |
| ABS resin (*) as such | 100 | 18 |
| ABS resin (*) containing 20% by weight of a mixture of nona- and octabromodiphenyl and 10% by weight of antimony trioxide, at self-extinguishing degree = V0 | 135 | 28 |
| ABS resin (*) containing 30% by weight of melamine bromohydrate, at extinguishing degree = V0 | 65 | 10,5 |

(*) consisting of 15% butadiene; 25% acrylonitrile; 60% styrene.

TABLE VI

| | Corrosivity | | | |
|---|---|---|---|---|
| | 200° C. | 220° C. | 240° C. | 260° C. |
| Polypropylene containing 3% by weight of 2,2-bis [-4-(2,3-dibromophenyl]propane and 1% by weight of antimony trioxide at self-extinguishing degree = V 2 | nil | slight | moderate | strong |

TABLE VI-continued

|  | Corrosivity | | | |
| --- | --- | --- | --- | --- |
|  | 200° C. | 220° C. | 240° C. | 260° C. |
| Polypropylene containing 3% by weight of ammonium bromide at self-extinguishing degree = V 2 | moderate | strong | very strong | — |
| Polypropylene containing 3% by weight of melamine bromohydrate, at self-extinguishing degree = V 2 | nil | nil | nil | slight | nil = no sign or strain of corrosion
slight = some slight shade of rust formation
medium = evident traces of rust formation
strong = large rust stains
very strong = completely rusted surface

What I claim is:

1. Polymeric compositions having self-extinguishing properties and comprising, by weight:
   from 94 to 96.9% of a thermoplastic polymer selected from the group consisting of polypropylene and ethylene/propylene copolymers;
   from 3 to 5% of melamine monobromohydrate; and
   from 0.1 to 0.5% of a free radical promoter selected from the group consisting of 2,3-dimethyl-2,3-diphenyl butane and 2,3-dimethyl-2,3-diphenyl hexane or from 0.05 to 0.1% by weight of an organic peroxide.

2. The method of rendering a thermoplastic olefinic polymer self-extinguishing which consists in incorporating in the polymer, an effective amount of melamine monobromohydrate and a free radical promoter.

3. The method of claim 2, in which the thermoplastic olefinic polymer is selected from the group consisting of polypropylene, polypropylene modified with ethylene, ethylene/propylene copolymers, mixtures of polypropylene with up to 20% by weight of ethylene/propylene elastomeric copolymers containing up to 50% by weight of copolymerized ethylene polystyrene, and the free radical promoter is selected from the group consisting of 2,3-dimethyl-2,3-diphenyl butane and 2,3-dimethyl-2,3-diphenyl hexane and organic peroxides.

* * * * *